H. W. HYDE.
VEHICLE SPRING SUSPENSION.
APPLICATION FILED APR. 24, 1916.

1,195,021.

Patented Aug. 15, 1916.

INVENTOR:
Henry Webb Hyde
Macleod, Colan, Copeland & Delle
Attys.

UNITED STATES PATENT OFFICE.

HENRY WEBB HYDE, OF BOSTON, MASSACHUSETTS.

VEHICLE SPRING SUSPENSION.

1,195,021.  Specification of Letters Patent.  Patented Aug. 15, 1916.

Application filed April 24, 1916.  Serial No. 93,117.

*To all whom it may concern:*

Be it known that I, HENRY WEBB HYDE, a citizen of the United States, residing at Boston, county of Suffolk, State of Massachusetts, have invented a certain new and useful Improvement in Vehicle Spring Suspension, of which the following is a specification, reference being had therein to the accompanying drawings.

My invention relates to an improvement in spring suspension for use in connection with motor vehicles or the like and has for its object a construction and arrangement such that road shocks in a large degree are not transmitted to the body but to an independent load which is particularly designed to receive them.

A further object of my invention is to arrange the device so that any cumulative vibrations of the body or frame of the vehicle are broken up and neutralized. To effect this end, I provide a spring a part of which supports the body and frame, and a part of which supports a load which is capable of vibrating independently of the body and frame. The arrangement of the body, spring and independent load is such that the tendency of the independent load to vibrate is greater than the tendency of the body to vibrate, due to the fact that the pressure exerted by the spring more readily overcomes the inertia of the independent load than the inertia of the body. In this manner a spring suspension is provided which absorbs the greater part of road shocks and reduces the body vibrations to a minimum.

My invention will be fully understood when taken in connection with the accompanying drawings and the novel features thereof will be pointed out and clearly defined in the claims at the close of this specification.

Figure 1:
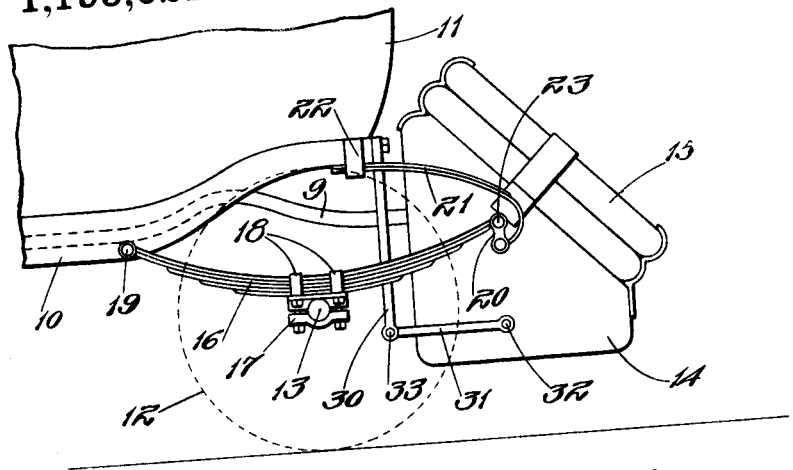
Figure 2:
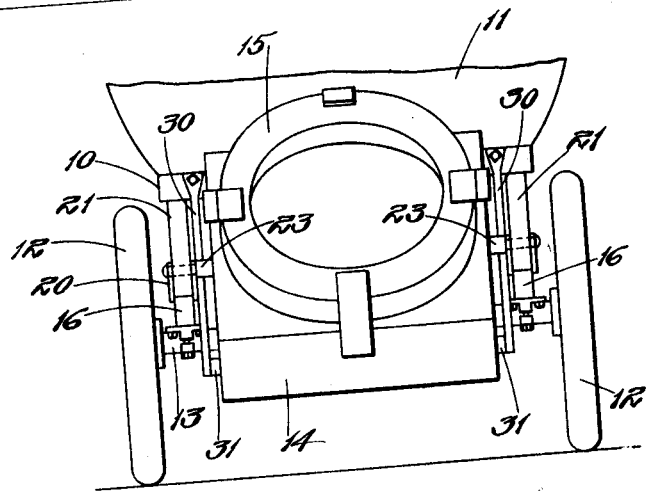
Figure 3:
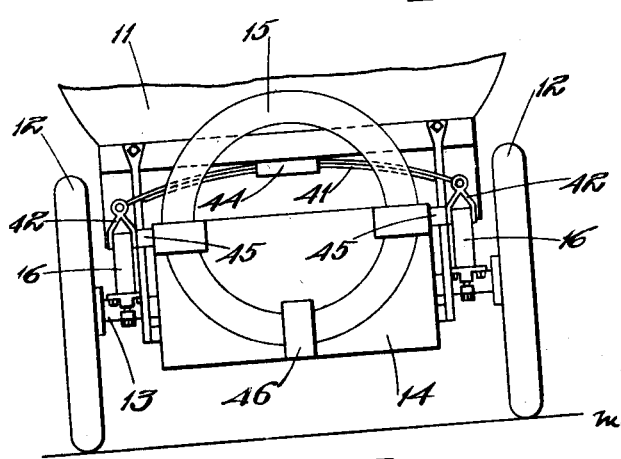

In the drawings, Figure 1 is a side elevation showing a portion of the rear end of an automobile provided with a device embodying my invention. Fig. 2 is a rear view of the vehicle as shown in Fig. 1. Fig. 3 is a view similar to Fig. 2 showing a modified form of device embodying my invention.

Having reference to the drawings there is shown at 10 the rear end of the frame of a motor vehicle which is adapted to support any common form of body 11 and which for convenience will be treated as a part of the body. At 12 is shown the wheel, at 13 the axle, at 14 the fuel tank and at 15 the tires which may be secured in position in any well known manner.

A spring member 16 of usual form is secured to the axle 13 by means of a collar 17 and a pair of clips 18. The collar 17 is preferably so arranged that it may pivot about the axle 13. While I have shown one form of means for securing the spring 16 to the axle 13, I do not wish to limit myself to the particular means shown for any well known form of connection may be employed. One end of the spring 16 is pivotally connected to a lug 19 secured to the frame 11 and the other end of the spring 16 is pivotally connected to a spring shackle 20 which is in turn pivotally connected to a smaller spring 21 fixed at 22 to the frame 11. The spring construction described is provided at both sides of the frame 10 as shown in Fig. 2.

The fuel tank 14 may be of any well known shape or construction and is provided at each end with a lug 23 which forms a shackle bolt for connecting the shackles 20 with the end of the springs 16. The lugs 23 are preferably arranged slightly above the center of the tank 14 so that the tank and tires will be supported substantially in a vertical position as shown. In this manner the tank is pivotally hung at its ends on the rear end of each of the springs 16 at each side of the frame as is clearly shown in the drawings. In order that the tank 14 and tires 15 will not swing about the pivots 23, I provide a bracket 30 which is secured to each side of the frame as shown in Figs. 1 and 2, and connect the said brackets 30 with each end of the tank 14 by links 31 pivotally connected to the tank at 32 and to the brackets at 33. Fuel is transmitted from the tank 14 by a flexible pipe 9 of any common form. The tank may be rigidly secured to each of the springs 16 if desired or pivotally hung on the springs in any other well known manner, my object being to suspend the tank on the springs 16 so that it may move independently of the body and frame. It will be understood further that I do not wish to limit myself to the use of a tank and tires in this connection, but may equally well employ an independent load of another nature such as a trunk, tool kit or the like.

The spring 16 is of the usual capacity necessary to sustain one half of the load on the rear axle. The spring 21 is of a capacity capable of use for a load equal to the difference between the weight of that portion of the body resting at 19 on the spring 16 and the weight of that portion of the independent load, represented by the tank 14 and tires 15, resting at 23 on the end of the spring 16. For example, if the load on the point 19 is five hundred pounds in weight, and the weight of the tank and tires or independent load on the point 23 is three hundred pounds, the spring 21 is adapted for a load of two hundred pounds. Following out this example, the front portion of the spring 16 exerts a pressure of five hundred pounds against the frame 11, and the rear portion of the spring 16 exerts a pressure of five hundred pounds against the tank 14 and against the spring 21. When at rest, therefore, the parts are in balance. When the axle moves up, however, owing to an unevenness in the road, the movement of the axle is transmitted through spring 16 as an upward pressure. The upward pressure of the spring 16 is resisted at one end by the body and at the other end by the independent load and spring 21. The amount of movement imparted to the body and to the independent load by the upper pressure of the spring 16 is dependent upon the resistance to movement offered by the body and by the independent load. Owing to the well known principle that the inertia of a weight increases as the acceleration increases the resistance to the pressure exerted by each end of the spring 16 will be materially different, for at one end of the spring the resistance to movement is entirely that of the inertia of the body, while at the other end of the spring, the resistance to movement consists of the inertia of the independent weight 14 and 15 and of the pressure of the spring 21. Due to the fact that the resistance of a spring does not vary with its acceleration, the resistance to acceleration of the independent weight end of the spring 16 is always less than that of the body end of the spring 16. This being the case the independent load will accelerate faster than the body and consequently will move farther in a given interval of time. In other words in any material acceleration the relative movement of the independent load is materially greater than that of the body.

In the device shown and described herein the spring 16 operates as a modified lever with the axle 13 as a fulcrum. If the axle 13 is raised and the acceleration is such that the resistance offered by the independent weight end of the spring 16 is materially less than the resistance offered by the body end of the spring 16 the movement of the body will be less than the movement it normally would have when mounted on both ends of the spring in the usual manner by an amount which is substantially equal to the amount of movement of the independent weight greater than is normally the case. In other words a quick vibration of the axle will be transmitted in marked degree to the independent load and in relatively slight degree of the body. The vibrations of the body, therefore, will be relatively small even when the axle is subjected to excessive road shocks. Furthermore, the lever action of the spring 16 referred to above will operate to break up the vibrations which the body is subjected to and to consequently reduce the body motion to a minimum. This is due to the fact that the greater vibrations of the independent weight are non-synchronous with the lesser vibrations of the body so that the independent weight for example is coming down before the body starts to come down, and when the body does come down it is met by an increased pressure on the forward end of the spring 16 due to the momentum of the independent weight at the other end of the spring. In this manner the vibrations of the body are quickly broken up.

Fig. 3 of the drawings shows a modified form of spring suspension embodying my invention. In this device the springs 16 are mounted on the axle 13 as described above in connection with Figs. 1 and 2. A platform spring 41, of usual form and of the same relative strength as the springs 21 is connected to the rear ends of the springs 16 by shackles 42 and to the frame 10 by a member 44. The fuel tank 14 is mounted beneath the platform spring 41 on lugs 45, the outer ends of which are adapted to be received through the shackles 42 and form shackle bolts by which the shackles 42 are connected with the springs 16. The tank 14 is in this case preferably rectangular in shape, and supports the tires 15 on brackets 46 as shown. The tank 14 is thus pivotally hung on the springs 16 and is capable of moving relatively to the body being preferably connected therewith by a link connecting means similar to that shown in Fig. 1. Thus the platform spring is a modified form of spring 21 described above and acts in the same way.

I do not wish to limit myself to the particular constructions shown for it will be obvious that the type of springs and their arrangement may be varied without departing from the spirit of my invention.

What I claim is:

1. In a device of the character described, the combination of a body, an axle, a plurality of springs supporting said body on said axle and a weight secured to said springs at an intermediate point between said body and said axle, said weight being free to move independently of said body and axle.

2. In a device of the character described, the combination of a body, an axle, a weight movable relatively to said body and axle, a spring on said axle which supports said body at one side of said axle and supports said weight at the other side of said axle, said parts being arranged to cause said weight to have greater vibrations than said body, and a second spring connecting said body to said weight.

3. In a device of the character described, the combination of a body, a weight mounted to move relatively to the body, a spring supporting both said weight and said body, a support for said spring, and a second spring supported by said first spring and connected with said body.

4. In a device of the character described, the combination of a body, a weight mounted to move relatively to the said body, a pair of springs at the junction of which said weight is located, both of said springs being connected with the body and the weight, and a support for one of said springs.

5. In a device of the character described, a body, an axle, a spring resting on said axle and supporting said body at one end, a weight mounted to be capable of movement relatively to said body and resting on the opposite end of said spring from that on which said body rests, and a second spring connecting said weight to said body.

6. In a device of the character described, the combination of a body, an axle, a weight mounted to move independently of said body, a spring on said axle which is connected to said body at one side of said axle and is pivotally connected to said weight at the other side of said axle, a second spring connecting said body to said weight, and a link which is pivotally connected to said weight and to said body.

7. In a device of the character described, the combination of a body, an axle, a spring on each side of said body resting on said axle and connected with said body at one end, a weight having a pivotal connection at each end with the opposite end of each of said springs to that to which said body is connected, and a second spring connecting said weight to said body.

8. In a device of the character described, an axle, a spring on said axle, a body mounted on one end of said spring, an independent weight mounted on the other end of said spring, said weight being less than that of the body, and a second spring connecting said weight to said body which is adapted normally to exert a pressure equal to the difference between the weight of the body and that of the independent weight.

In testimony whereof I affix my signature, in presence of two witnesses.

HENRY WEBB HYDE.

Witnesses:
 CAMERON MACLEOD,
 ALICE H. MORRISON.